United States Patent
Jordan, III et al.

(10) Patent No.: US 10,521,987 B1
(45) Date of Patent: Dec. 31, 2019

(54) ENHANCED ELECTRIFIED VEHICLE CHARGER SECURITY

(71) Applicant: FORD GLOBAL TECHNOLOGIES, LLC, Dearborn, MI (US)

(72) Inventors: Dale F. Jordan, III, Royal Oak, MI (US); Matthew Erich Von Der Lippe, Canton, MI (US); Jude Berthault, Ypsilanti, MI (US); Jeffrey Alan Palic, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/004,933

(22) Filed: Jun. 11, 2018

(51) Int. Cl.
| | | |
|---|---|---|
| *G07C 9/00* | (2006.01) | |
| *H04B 5/00* | (2006.01) | |
| *B60L 53/16* | (2019.01) | |
| *B60L 53/60* | (2019.01) | |
| *B60L 11/18* | (2006.01) | |
| *B60K 6/22* | (2007.10) | |

(52) U.S. Cl.
CPC .......... *G07C 9/00309* (2013.01); *B60L 53/16* (2019.02); *B60L 53/60* (2019.02); *H04B 5/0056* (2013.01); *B60K 6/22* (2013.01); *B60L 2270/30* (2013.01); *B60Y 2200/92* (2013.01); *Y10S 903/904* (2013.01)

(58) Field of Classification Search
CPC ............. G07C 9/00309; B60L 11/1818; B60L 11/1838; B60L 2270/30; B60L 2270/32; B60L 53/16; B60L 53/30; B60L 53/305; B60L 53/60; B60L 53/66; B60L 53/68; B60K 6/22; B60Y 2200/92; H04B 5/0056; Y10S 903/904; Y02T 90/12; Y02T 90/128; Y02T 90/163
USPC ........................................................ 340/5.61
See application file for complete search history.

(56) References Cited

U.S. PATENT DOCUMENTS

| | | | |
|---|---|---|---|
| 8,996,876 B2 | 3/2015 | Outwater et al. | |
| 2011/0106329 A1 | 5/2011 | Donnelly et al. | |
| 2012/0112697 A1* | 5/2012 | Heuer | B60L 11/1818 320/109 |
| 2012/0280783 A1* | 11/2012 | Gerhardt | G07C 9/00309 340/5.6 |
| 2013/0110296 A1* | 5/2013 | Khoo | G06F 1/26 700/286 |
| 2013/0127416 A1 | 5/2013 | Karner et al. | |
| 2013/0222111 A1* | 8/2013 | Inoue | G05B 1/01 340/5.65 |
| 2014/0167695 A1* | 6/2014 | Shimizu | H01R 13/6275 320/109 |

(Continued)

FOREIGN PATENT DOCUMENTS

EP 2426006 A2 3/2012

*Primary Examiner* — Edwin C Holloway, III
(74) *Attorney, Agent, or Firm* — David Kelley; Brooks Kushman P.C.

(57) ABSTRACT

A vehicle charging system includes a locking mechanism to secure a charge plug to a charge port of a vehicle. The system includes a wireless transceiver and a near field communication transceiver. The system further includes a controller programmed to, responsive to receiving a request to disengage the locking mechanism during charging, send the request to a vehicle owner via the wireless transceiver, and, responsive to receiving an unlock command via the wireless transceiver, disengage the locking mechanism.

20 Claims, 4 Drawing Sheets

(56) References Cited

U.S. PATENT DOCUMENTS

| | | | |
|---|---|---|---|
| 2014/0167913 A1* | 6/2014 | Morita | G07C 9/00174 340/5.61 |
| 2015/0061594 A1* | 3/2015 | Hockenstrom | B60L 8/006 320/109 |
| 2015/0123468 A1* | 5/2015 | Wu | H02H 1/00 307/10.1 |
| 2016/0117874 A1* | 4/2016 | Daniel-Wayman | G07C 9/00309 340/5.61 |
| 2016/0257211 A1* | 9/2016 | Kimura | B60L 53/305 |
| 2017/0015209 A1* | 1/2017 | Badger, II | G06Q 30/06 |

* cited by examiner

ENHANCED ELECTRIFIED VEHICLE CHARGER SECURITY

TECHNICAL FIELD

This application generally relates to a system for locking and unlocking a charge connector connected to an electrified vehicle.

BACKGROUND

Electrified vehicles use electrical energy for propulsion. Such vehicles may store energy on-board for later use. Electrical infrastructure may include charging stations to which an electrified vehicle may be connected for recharging. The charging stations typically include a physical connection between the vehicle and the charging station. As charging may require a long period of time, the vehicle is typically left unattended during charging. During this time, opportunities exist for others to remove the physical connection. For example, a person could remove the charge connection from a charging vehicle and connect it to another vehicle.

SUMMARY

A vehicle includes a wireless transceiver and a near field communication (NFC) transceiver. The vehicle further includes a controller programmed to engage a lock mechanism for securing a charge plug during charging and, responsive to receiving a request to unlock the charge plug via the NFC transceiver, transmit an unlock request to a vehicle owner via the wireless transceiver, and, responsive to receiving an unlock command via the wireless transceiver, disengage the lock mechanism.

The wireless transceiver may be a cellular modem. The wireless transceiver may be a wireless network interface. The controller may be further programmed to, responsive to receiving the unlock command, terminate charging. The controller may be further programmed to command a charger to disengage the lock mechanism via the wireless transceiver. The controller may be further programmed to, transmit an unlock response via the NFC transceiver. The controller may be further programmed to, responsive to receiving the unlock command and detecting that the charge plug is still present after expiration of a predetermined amount of time, engage the lock mechanism.

A charging system includes a lock mechanism configured to secure a charge plug to a charge port of a vehicle. The charging system includes a near field communication (NFC) transceiver and a cellular modem. The charging system further includes a controller programmed to, responsive to the lock mechanism being engaged and receiving a request to unlock the charge plug via the NFC transceiver, transmit an unlock request to a vehicle owner via the cellular modem, and, responsive to receiving an unlock command via the cellular modem, disengage the lock mechanism.

The NFC transceiver and the cellular modem may be installed in the vehicle. The NFC transceiver and the cellular modem may be installed in a charge station. The unlock request may sent as an email to an email address associated with the vehicle owner. The unlock request may be sent as a text message to a phone number associated with the vehicle owner. The unlock request may be sent as data for an application that is executed on a nomadic device. The controller may be further programmed to, responsive to receiving the request and detecting that the charge plug is still present after expiration of a predetermined amount of time, engage the lock mechanism. The controller may be further programmed to, responsive to receiving the unlock command, terminate charging.

A method includes receiving, via a near field communication transceiver of a vehicle, a request to disengage a lock mechanism securing a charge plug to a charge port of a vehicle during charging. The method includes sending, via a wireless transceiver of the vehicle, the request to a vehicle owner. The method includes disengaging, by a controller, the lock mechanism responsive to receiving an unlock command via the wireless transceiver.

The method may further include engaging, by the controller, the lock mechanism responsive to expiration of a predetermined amount of time after receiving the unlock command and detecting a presence of the charge plug. The method may further include sending, via the near field communication transceiver, a response status indicative of a response received via the wireless transceiver. The method may further include transmitting, via the wireless transceiver, a command to a charger to disengage the lock mechanism. The method may further include executing an application on a remote device that is coupled to a network to receive the request and send the unlock command.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
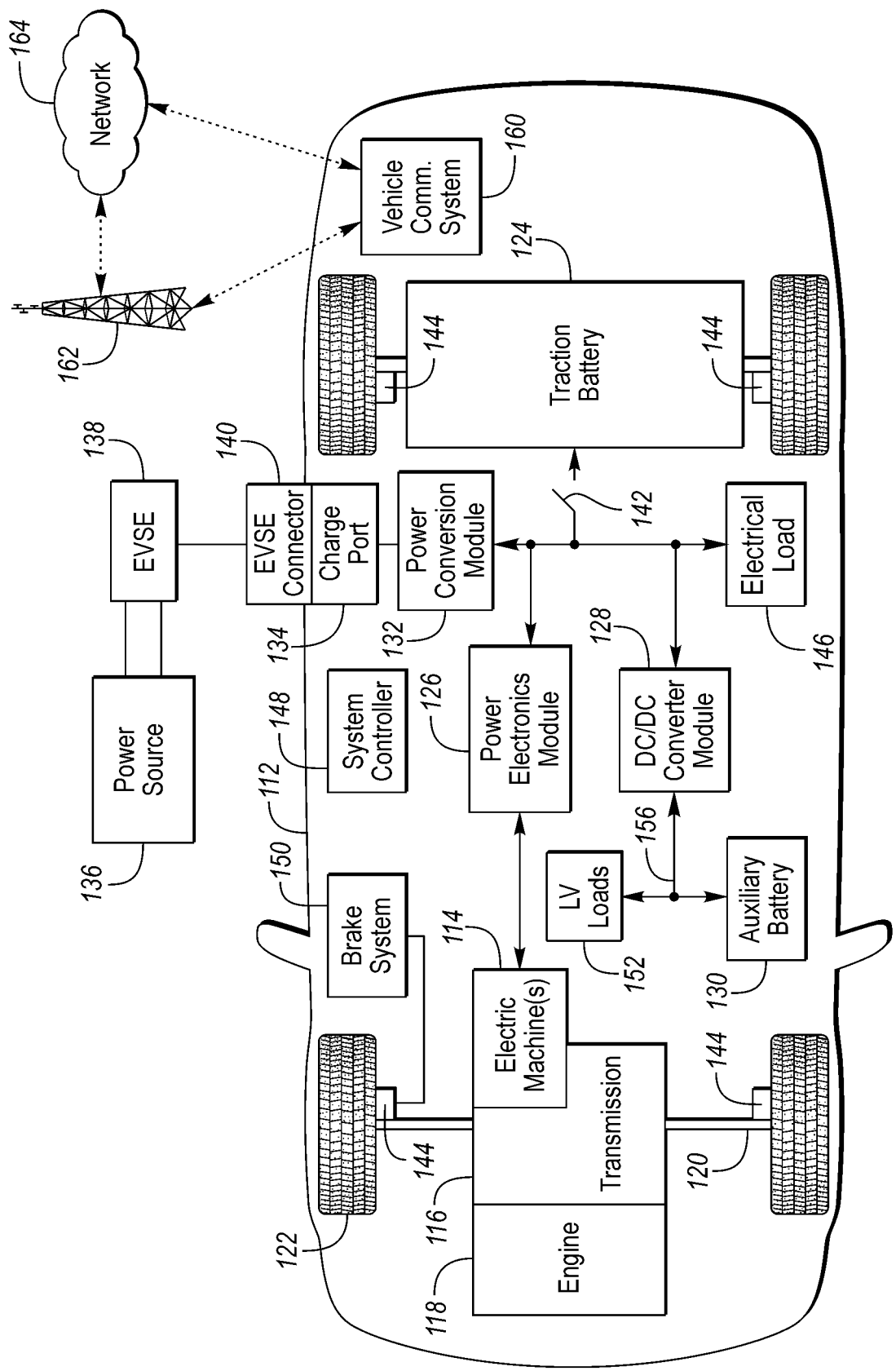
FIG. 1 is a diagram of an electrified vehicle illustrating drivetrain and energy storage components including an electric machine.

FIG. 1 depicts an electrified vehicle 112 that may be referred to as a plug-in hybrid-electric vehicle (PHEV). A plug-in hybrid-electric vehicle 112 may comprise one or more electric machines 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and deceleration capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. An electrified vehicle 112 may also be a battery electric vehicle (BEV). In a BEV configuration, the engine 118 may not be present.

A traction battery or battery pack 124 stores energy that can be used by the electric machines 114. The vehicle battery pack 124 may provide a high voltage direct current (DC) output. The traction battery 124 may be electrically coupled to one or more power electronics modules 126 (may also be referred to as a traction inverter). One or more contactors 142 may isolate the traction battery 124 from other components when opened and connect the traction battery 124 to other components when closed. The power electronics module 126 is also electrically coupled to the electric machines 114 and provides the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

The vehicle 112 may include a variable-voltage converter (VVC) (not shown) electrically coupled between the traction battery 124 and the power electronics module 126. The VVC may be a DC/DC boost converter configured to increase or boost the voltage provided by the traction battery 124. By increasing the voltage, current requirements may be decreased leading to a reduction in wiring size for the power electronics module 126 and the electric machines 114. Further, the electric machines 114 may be operated with better efficiency and lower losses.

In addition to providing energy for propulsion, the traction battery 124 may provide energy for other vehicle electrical systems. The vehicle 112 may include a DC/DC converter module 128 that converts the high voltage DC output of the traction battery 124 to a low voltage DC supply that is compatible with low-voltage vehicle loads 152. An output of the DC/DC converter module 128 may be electrically coupled a low-voltage bus 156 and to an auxiliary battery 130 (e.g., 12V battery) for charging the auxiliary battery 130. The low-voltage systems 152 may be electrically coupled to the low-voltage bus 156. One or more electrical loads 146 may be coupled to the high-voltage bus. The electrical loads 146 may have an associated controller that operates and controls the electrical loads 146 when appropriate. Examples of electrical loads 146 may be a fan, an electric heating element and/or an air-conditioning compressor.

The electrified vehicle 112 may be configured to recharge the traction battery 124 from an external power source 136. The external power source 136 may be a connection to an electrical outlet. The external power source 136 may be electrically coupled to a charger or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically coupled to a charger or on-board power conversion module 132. The power conversion module 132 may condition the power supplied from the EVSE 138 to provide the proper voltage and current levels to the traction battery 124. In some configurations, the power conversion module 132 may be integrated with the EVSE 138 external to the vehicle 112. The power conversion module 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

One or more wheel brakes 144 may be provided for decelerating the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144 for vehicle deceleration. The brake system 150 may respond to driver commands and may also operate autonomously to implement features such as stability control. The controller of the brake system 150 may implement a method of applying a requested brake force when requested by another controller or sub-function.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic module that is present in the vehicle 112. A vehicle system controller (VSC) 148 may be present to coordinate the operation of the various components.

The vehicle 112 may include a vehicle communication system (VCS) 160. The vehicle communication system 160 may be configured to facilitate communication with external devices through various communication channels. The VCS 160 may be configured to communicate via a cellular tower 162 and directly and/or indirectly with an external network 164.

Figure 2:
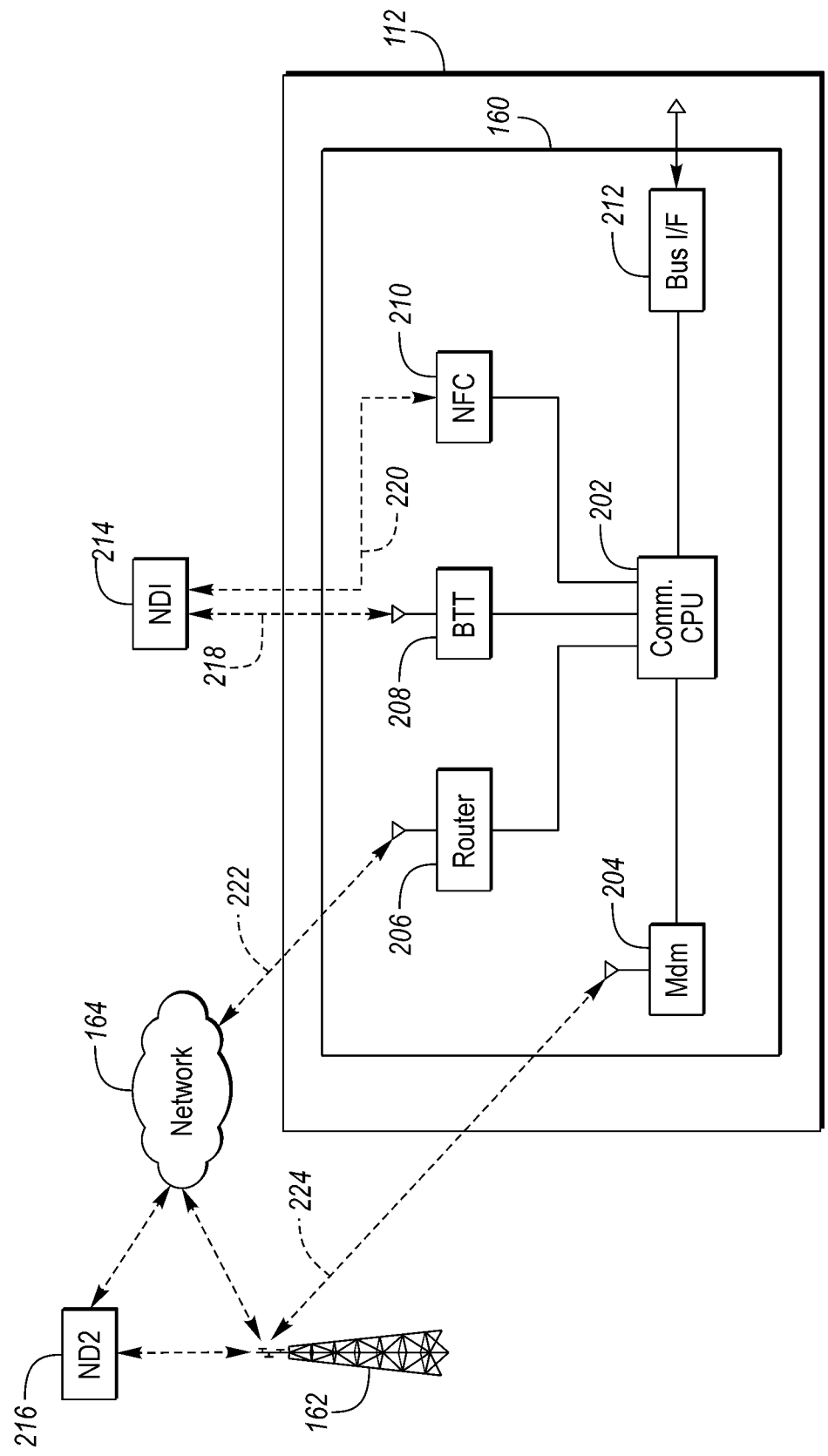
FIG. 2 is a diagram of the electrified vehicle with a vehicle communication system configured to communicate with nomadic devices.

FIG. 2 illustrates an example block topology for the vehicle communication system 160 (VCS). An example of the VCS 160 is the SYNC system manufactured by THE FORD MOTOR COMPANY. The electrified vehicle 112 that is configured with the VCS 160 may contain a visual front-end interface located in the electrified vehicle 112. A vehicle occupant or owner may be able to interact with the interface if it is provided, for example, with a touch sensitive screen. In another illustrative embodiment, the interaction occurs through, button presses, spoken dialog system with automatic speech recognition and speech synthesis.

In the example shown in FIG. 2, at least one communication controller 202 controls at least some portion of the operation of the VCS 160. Provided within the vehicle 112, the communication controller 202 allows onboard processing of commands and routines. Further, the communication controller 202 may include or be connected to both non-persistent storage and persistent storage. The non-persistent storage may be a random-access memory (RAM) and the persistent storage may be a hard disk drive (HDD) or flash memory. Non-transitory memory may include both persistent memory and RAM. In general, persistent storage may include all forms of memory that maintain data when a computer or other device is powered down. These include, but are not limited to, HDDs, CDs, DVDs, magnetic tapes, solid state drives, portable USB drives and any other suitable form of persistent memory.

The communication controller 202 may also include several different inputs allowing the user and external systems to interface with the communication controller 202. The VCS 160 may include a microphone, an auxiliary input port (for input), a Universal Serial Bus (USB) input, a Global Positioning System (GPS) input, a screen, which may be a touchscreen display, and a Bluetooth transceiver 208. The VCS 160 may further include an input selector that is configured to allow a user to swap between various inputs. Input from both the microphone and the auxiliary connector may be converted from analog to digital by an analog-to-digital (A/D) converter before being passed to the communication controller 202. The VCS 160 may further include a vehicle bus interface 212 to communicate over the vehicle network. Vehicle components and auxiliary components in communication with the VCS 160 may use the vehicle network (such as, but not limited to, a Controller Area Network (CAN) bus, a Local Interconnect Network (LIN) bus, a Media Oriented System Transport (MOST) bus, an Ethernet bus, or a FlexRay bus) to pass data to and from the VCS 160 (or components thereof).

Outputs from the communication controller 202 may include, but are not limited to, a visual display and a speaker or stereo system output. The speaker may be connected to an amplifier and receive its signal from the communication controller 202 through a digital-to-analog (D/A) converter. The communication controller 202 may further provides outputs to other controllers in the vehicle 112 that are connected to the vehicle network. Outputs may also be made to a remote Bluetooth device such as a Personal Navigation Device (PND) or a USB device such as vehicle navigation device via bi-directional data streams.

The VCS 160 may use a Bluetooth transceiver 208 with an associated antenna to communicate with a nomadic device 214 (e.g., cell phone, smart phone, Personal Digital Assistance (PDA), or any other device having wireless remote network connectivity). The nomadic device 214 can then be used to communicate over a tower-network communication path with the network 164 outside of the vehicle 112 through, for example, a device-tower communication path with the cellular tower 162. In some embodiments, the cellular tower 162 may include a wireless Ethernet or WiFi access point as defined by Institute of Electrical and Electronics Engineers (IEEE) 802.11 family of standards. Exemplary communication between the nomadic device 214 and the Bluetooth transceiver 208 may be represented by a Bluetooth signal path 218.

In some configurations, pairing the nomadic device 214 and the Bluetooth transceiver 208 can be instructed through a button or similar input. Accordingly, the communication controller 202 may be instructed that the onboard Bluetooth transceiver 208 will be paired with a Bluetooth transceiver in a nomadic device 214. After being paired with the onboard Bluetooth transceiver 208, the nomadic device 214 may automatically establish a Bluetooth connection when the in range of the vehicle 112. The pairing process may require vehicle access and may be limited to devices authorized by the vehicle owner.

Data may be communicated between the communication controller 202 and the network 164 utilizing, for example, a data-plan, data over voice, or Dual Tone Multi Frequency (DTMF) tones associated with the nomadic device 214. The nomadic device 214 can then be used to communicate over the tower-network communication path with the network 164 outside the vehicle 112 through, for example, device-tower communication path with the cellular tower 162. Alternatively, it may be desirable to include an onboard modem 204 having an antenna to establish a vehicle-tower communication path 224 for communicating data between the communication controller 202 and the network 164 over the voice band. In some embodiments, the modem 204 may establish the vehicle-tower communication path 224 directly with the cellular tower 162 for communicating via the network 164. As a non-limiting example, modem 204 may be a USB cellular modem and vehicle-tower communication path 224 may be a cellular communication channel.

In one illustrative embodiment, the communication controller 202 may be provided with an operating system including an application programming interface (API) to communicate with modem application software. The modem application software may access an embedded module or firmware on the Bluetooth transceiver 208 to complete wireless communication with a remote Bluetooth transceiver (such as that found in a nomadic device 214). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Other wireless communication means that can be used in this realm is free-space optical communication (such as IrDA) and non-standardized consumer IR protocols or inductive coupled means including but not limited to near-field communications (NFC) systems such as RFID.

In some configurations, the nomadic device 214 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Division Multiple Access (CDMA), Time Division Multiple Access (TDMA), Space-Division Multiple Access (SDMA) for digital cellular communication, including but not limited to Orthogonal Frequency-Division Multiple Access (OFDMA) which may include time-domain statistical multiplexing. These are all International Telegraph Union (ITU) International Mobile Telecommunication (IMT) 2000 (3G) compliant standards and offer data rates up to 2 Mbps for stationary or walking users and 385 Kbps for users in a moving vehicle. 3G standards are now being replaced by IMT-Advanced (4G) which offers 100 Mbps for users in a vehicle and 1 Gbps for stationary users. If the user has a data-plan associated with the nomadic device 214, it is possible that the data-plan allows for broad-band transmission and the system could use a much wider bandwidth (speeding up data transfer).

In some configurations, incoming data can be passed through the nomadic device 214 via a data-over-voice or data-plan, through the onboard Bluetooth transceiver 208 and to the communication controller 202. In the case of certain temporary data, for example, the data can be stored on the HDD or other storage media until the data is no longer needed.

The communication controller 202 may be in communication with a variety of other auxiliary devices. The auxiliary devices can be connected through a wireless (e.g., via auxiliary device antenna) or wired (e.g., auxiliary device USB) connection. Auxiliary devices may include, but are not limited to, personal media players, wireless health devices, portable computers, and the like.

The communication controller 202 may be connected to a Near Field Communication (NFC) system 210. The NFC system 210 may include antennas, NFC transceivers, and supporting circuitry for implementing NFC communications. The NFC system 210 may be configured to establish communication with compatible devices that are in proximity to one of the NFC antennas. The NFC communication protocol may be useful for identifying compatible nomadic devices that are proximate the NFC system 210. In some configurations, the communication controller 202 may be configured to establish a peer-to-peer communication between the vehicle 112 and the nomadic device 214 to exchange data according to a protocol. For example, the NFC system 210 may support exchanging data in NFC Data Exchange Format (NDEF). The NFC system 210 may be compatible with standards such as ISO/IEC 144443 and ISO/IEC 18092.

Also, or alternatively, the communication controller 202 may be connected to a vehicle-based wireless router 206, using for example a WiFi (IEEE 802.11) transceiver/antenna. The wireless router 206 may also be referred to as a wireless network interface and may include hardware and software components for connecting to a wireless network. The wireless router 206 may establish a vehicle-network communication path 222 between the network 164 and the communication controller 202. This may allow the communication controller 202 to connect to remote networks in range of the local router 206. In some configurations, the router 206 and the modem 204 may be combined as an integrated unit. However, features to be described herein may be applicable to configurations in which the modules are separate or integrated.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

The vehicle communication system 160 may be further configured to establish a communication connection to a second nomadic device 216 that may be located a distance from the vehicle 112. The distance may be such that a Bluetooth and/or NFC communication path cannot be established between the vehicle communication system 160 and the second nomadic device 216. The second nomadic device 216 may be configured with a cellular interface to establish a communication path with the cellular tower 162. The second nomadic device 216 may be configured to establish a communication path with the network 164 (e.g., via WiFi connection). By establishing the communication path, the second nomadic device 216 can establish a connection with the vehicle 112.

Charge stations (e.g., EVSE 138) may be publicly accessible devices. As such, the charge station may be used by any member of the public desiring to charge their vehicle. Issues may arise when there is high demand for charging at that location. Many charge systems may not include a mechanism for securing the charge plug to the vehicle during charging. In such systems, charging may be interrupted by removing the charge plug. An issue of "charge stealing" arises as a person may remove the charge plug from one vehicle and insert it into another thereby effectively stealing the charge from another. In charge stations that require payment, this raises the possibility of actually receiving electricity paid for by the victim vehicle owner. In addition to the possible monetary loss, customers may potentially be stranded as the vehicle is not charged as expected. This may leave vehicle owners stranded and dissatisfied with their electrified vehicle experience.

The solution includes providing a system for securing the EVSE connector 140 to the charge port 134 of the vehicle 112 in a manner that only the vehicle owner may disconnect the EVSE connector 140. However, this may potentially reduce the capacity of the charge station to provide energy to other vehicles. For example, the capacity to charge other vehicle may be increased by freeing up the charge station when the vehicle is fully charged or charged to a predetermined level. An improved system may be one in which a potential charge station user and the vehicle owner can communicate in some manner to facilitate usage of the charge plug. This allows the charge plug to be shared with knowledge of all the parties involved. In particular, the system may free up charge plugs when the vehicle owner is away for a long period of time. For example, a vehicle owner parking at an office building may potentially leave the vehicle parked for the entire day. The system described can free up the charge plug without the vehicle owner having to move the vehicle or visit the vehicle.

Figure 3:
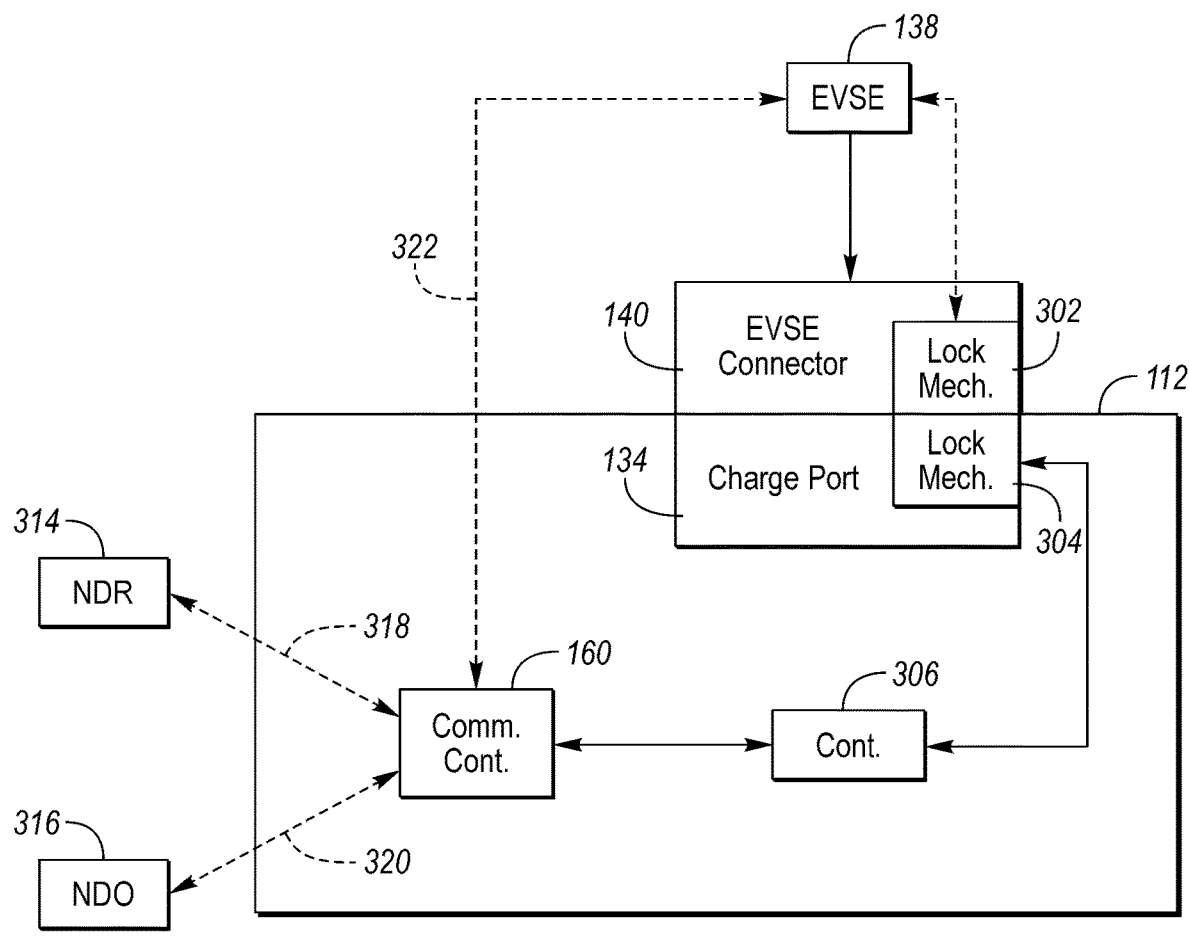
FIG. 3 is a diagram of a possible configuration for a locking charge connector system for a vehicle charging system.

FIG. 3 depicts a possible configuration for a charging system for the electrified vehicle 112. The vehicle 112 may include the communication controller 160 as described previously. The vehicle 112 may include a charge system controller 306 that is configured to communicate with the communication system 160 via the vehicle network. The vehicle 112 may include the charge port 134 that is configured to receive the EVSE connector 140. The charge port 134 may include a charge port locking mechanism 304. The EVSE connector 140 may include a charge plug locking mechanism 302. The charge port locking mechanism 304 and the charge plug locking mechanism 302 may be configured to cooperate to secure the EVSE connector 140 to the charge port 134 and/or vehicle 112. When the EVSE connector 140 is inserted in the charge port 134 with the locking mechanism engaged, the EVSE connector 140 may not be removed from the charge port 134 in the normal manner. The EVSE connector 140 may only be removed from the charge port 134 when the charge port locking mechanism 304 and the charge plug locking mechanism 302 are disengaged.

Various configurations for the locking mechanisms are possible. At least one of the charge plug locking mechanism 302 and the charge port locking mechanism 304 may be electrically actuated. For example, the locking mechanism may include a solenoid that is configured to engage and disengage the locking mechanism. The solenoid may move a pin that is integrated with the charge port 134 into and out of a corresponding aperture of the EVSE connector 140. The pin may be spring-loaded and the spring may be configured to bias the pin in an engaged or disengaged position. In some configurations, the pin and solenoid may be integrated in the EVSE connector 140 wherein the pin is configured to move into and out of a corresponding aperture of the charge port 134. Other examples may include a motor configured to rotate a latch into and out of a corresponding aperture. In some configurations, the default state of the locking mechanisms when the EVSE connector 140 is inserted in the charge port 134 may such that the locking mechanisms are engaged.

The charge system controller 306 may include a processor and include both non-persistent storage and persistent storage. The charge system controller 306 may include an interface to drive the electrical actuator of the charge port locking mechanism 304. The charge system controller 306 may include circuitry to drive a solenoid or motor. The charge system controller 306 may be programmed to actuate the electrical actuator to engage and/or disengage the charge port locking mechanism 304.

The EVSE 138 may include a controller that includes an interface to drive an electrical actuator associated with the charge plug locking mechanism 302. The EVSE controller may be configured provide a signal to the electrical actuator of the charge plug locking mechanism 302 to engage and/or disengage the mechanism. The signal may be hardwired through conductors of the EVSE connector and associated wiring harness. The EVSE 138 may also be configured to communicate with the vehicle 112 via a charger communication channel 322. The charger communication channel 322 may be a wireless communication channel such a wireless Ethernet or Bluetooth connection. The charger communication channel 322 may also be a wired connection through the EVSE connector 140 and charge port 134 interfaces. For example, the wired connection may be an Ethernet link. In some configurations, the charger communication channel 322 may be directly connected to the charge system controller 306.

The charger communication channel 322 may allow the vehicle-based charge system controller 306 to operate the charge plug locking mechanism 302. For example, an unlock command may be sent via the vehicle communication system 160 to the EVSE 138. The EVSE 138 may respond by sending the signal to drive the electrical actuator of the charge plug locking mechanism 302. In a similar manner, the charger communication channel 322 may allow the EVSE 138 to operate the charge port locking mechanism 304. For example, an unlock command may be sent through the vehicle communication system 160 to the charge system controller 306 that may respond by sending a signal to drive the electrical actuator of the charge port locking mechanism 304.

During charging, the locking mechanism may be engaged to prevent removal of the EVSE connector 140. In this state, the vehicle owner may leave the vehicle 112 without concern of the EVSE connector 140 being removed. The vehicle charging system may be configured to disengage the locking mechanism in several ways. The charge system controller 306 may include an interface to a control panel, button, and/or switch that is configured to initiate disengaging the locking mechanism. By pressing a button, or otherwise interacting with the interface, the charge system controller 306 may send a signal to disengage the lock mechanism. In some configurations, the locking mechanism may be disengaged automatically when the vehicle owner is proximate the vehicle. For example, the charging system may detect that the vehicle owner is proximate the vehicle when a key fob for operating/unlocking the vehicle is in communication with the vehicle. The vehicle owner may be proximate the vehicle if a nomadic device associated with the vehicle owner is within communication range of the vehicle.

The charge system controller 306 may be in communication with a nomadic device of the owner (NDO) 316 via the vehicle communications system 160. The vehicle communications system 160 may establish a first communication channel 320 with the owner nomadic device 316. The communication may be via the cellular modem 204 and/or the onboard router 206. For example, the first communication channel 320 may be a cellular connection or a wireless Ethernet connection. The first communication channel 320 may include a connection through an external network (e.g., network 164). The connection interface between the charge system controller 306 and the NDO 316 may include an email address, a phone number, or a data connection. The first communication channel 320 may be one in which the NDO 316 is not proximate the vehicle 112. That is, the first communication channel 320 may be a channel capable of long-range communication with the NDO 316.

In some configurations, the NDO 316 may be configured to execute an application or program. The application may utilize the communication channels of the NDO 316 to communicate via the network 164. The NDO 316 may establish a wireless Ethernet connection via a router that is connected to the network 164. The NDO 316 may establish a connection to the network 164 using a cellular communication channel. The application may provide an interface on a touch-screen display. For example, the application may be programmed to display various menus and selection options. Further, the application may be programmed to provide audible and/or visible notifications of various conditions. The application may be programmed to implement various features such as cabin preconditioning, door lock/unlock, vehicle status, and remote start. The application may be programmed to provide a notification in response to receiving a request to unlock the EVSE connector 140. In various configurations, the NDO 316 may be configured to provide an audible, visible, and/or tactile indication of the request. The application may be programmed to receive a response from the vehicle owner regarding the request. For example, the application may present a selection button for granting the request and/or denying the request.

The charge system controller 306 may be in communication with a nomadic device of a requestor (NDR) 314 via the vehicle communications system 160. The vehicle communications system 160 may establish a second communication channel 318 with the requestor nomadic device 314. The communication may be limited to the NDR 314 being proximate the vehicle. The communication may be via a short-range communication interface such as NFC or Bluetooth. The second communication channel 318 may have limited capability for communication. For example, for a Bluetooth configuration, the requestor nomadic device 314 may establish a connection with the vehicle communications system 160 but may not be paired through the Bluetooth transceiver 208. The communication interface may be limited to sending a request to unlock the charge port/connector locking mechanism. The vehicle communications system 160 may recognize that the connection should be of limited purpose based on the vehicle status. For example, the vehicle communications system 160 may monitor ignition status, charging status, and door lock status to determine that a limited connection is available. Indicators for establishing a limited connection may include the ignition being in an off position, the charging status being indicative of the charge plug being inserted in the charge port, and the door lock status being indicative of the doors being locked.

The NDR 314 may be configured to execute an application or program. The application may utilize the communication channels of the NDR 314 to communicate via second communication channel 318. The NDR 314 may include a compatible Bluetooth and or NFC communication system. The application may be programmed to provide an interface for requesting unlocking of the charge system locking mechanism when communication is established with a charging vehicle.

In some configurations, an antenna of the NFC system 210 may be physically located proximate the charge port 134 of the vehicle 112. When the NDR 314 is placed proximate an antenna of the NFC system 210, communication may be established between the charge system controller 306 and the NDR 314. The NDR 314 may send an unlock request using the NFC system 210 that is part of the vehicle communication system 160. The charge system controller 306 may send a response to the NDR 314 via the NFC system 210. However, this form of response is possible only when the NDR 314 remains proximate the antenna of the NFC system 210. In some configurations, the NDR 314 may transmit a phone number or email address of the requestor via the NFC system 210 as part of the request. The charge system controller 306 may then send a response to the NDR 314 via the email address or the phone number. In some configurations, the charge port 134 may include an indicator (e.g., an LED or display) that may provide feedback to the NDR 314 user. For example, the LED may be flashed at a first rate to indicate that the request was received and sent to the NDO 316. The LED may be flashed at a second rate if the request is denied and may be turned on without flashing if the request is granted. In other configurations, multiple LEDs of different color may be used to indicate the status.

The communication protocol may allow for a request to release the EVSE connector 140 by disengaging the locking mechanism. The NDR 314 may send an unlock request through the vehicle communications system 160. In response to receiving the unlock request, the charge system controller 306 may cause the request to be forwarded to the NDO 316. The format of the forwarded request to the NDO 316 may take several forms. For example, the charge system controller 306 may initiate transmission of a text message via a cellular connection. The charge system controller 306 may initiate sending an email message via a cellular data connection or wireless Ethernet connection. The charge system controller 306 may interact with an application that is executed on the NDO 316 to send the request to unlock message. The application may part of a broader vehicle application that allows the owner to interact with the vehicle. The request may also include the present state of charge of the traction battery 124. The vehicle owner may configure the vehicle communication system 160 by inputting the email address and/or phone number into the system. For example, a touch-screen display connected to the vehicle communications system 160 may include an interface for entering and changing the email address and/or phone number.

After forwarding the request to the NDO 316, the charge system controller 306 may monitor for a response from the NDO 316. The owner may send a response using the NDO 316. The response may be in the form of a text message or email. For example, a charge system controller 306 may wait for a text message with a reply of "YES" or "NO." The charge system controller 306 may then perform additional operations based on the response. The response may be in the form of a message packet received from the wireless transceiver (e.g., 204, 206). The message may be sent by the application that is executed on the NDO 316. The message may have a particular format and contents to indicate if the request is denied or accepted.

In response to receiving authorization from the NDO 316 to disengage the lock mechanism, the charge system controller 306 may stop charging of the traction battery 124. The charge system controller 306 may communicate with the EVSE 138 to stop charging the traction battery 124 and stop the power transfer through the charge port 134. This ensures that the connection between the EVSE connector 140 and the charge port 134 will not be interrupted while current is flowing therebetween.

After charging is terminated, the charge system controller 306 may actuate the electrical actuator associated with the charge port locking mechanism 304 to disengage the charge port locking mechanism 304. The EVSE connector 140 may now be removable from the charge port 134. In some configurations, the charge system controller 306 may issue a request to the EVSE 138 through the vehicle communications system 160 to request that the EVSE 138 actuate the electrical actuator associated with the charge plug locking mechanism 302.

The charge system controller 306 may monitor the connection between the EVSE connector 140 and the charge port 134 to ensure that the EVSE connector 140 is removed. For example, the charging system may include one or more proximity sensors to provide a signal indicative of the EVSE connector 140 being inserted in the charge port 134. If the EVSE connector 140 is not removed after a predetermined time period, then the charge system controller 306 may re-lock the locking mechanisms. After expiration of the predetermined time period, it may be assumed that the requestor no longer has interest in using the charge station. Upon relocking the EVSE connector 140, the charge system controller 306 may initiate charging of the traction battery 124.

In some configurations, the charge system controller 306 may command the locking mechanism to disengage when the vehicle is fully charged (e.g., when battery state of charge is 100%). In some configurations, the charge system controller 306 may command the locking mechanism to disengage when the battery state of charge exceeds a user-configurable state of charge level.

In some configurations, the EVSE 138 may include an NFC communication system to communicate with the NDR 314. The EVSE 138 may communicate with the vehicle communication system 160 via the charger communication channel 322. The request may be issued when the NDR 314 is proximate an NFC antenna of the EVSE 138. The request may be forwarded through the charger communication channel 322 to the vehicle communication system 160 and onto the NDO 316. This allows the vehicle owner information to remain with the vehicle 112 and not be passed to the EVSE 138.

Figure 4:
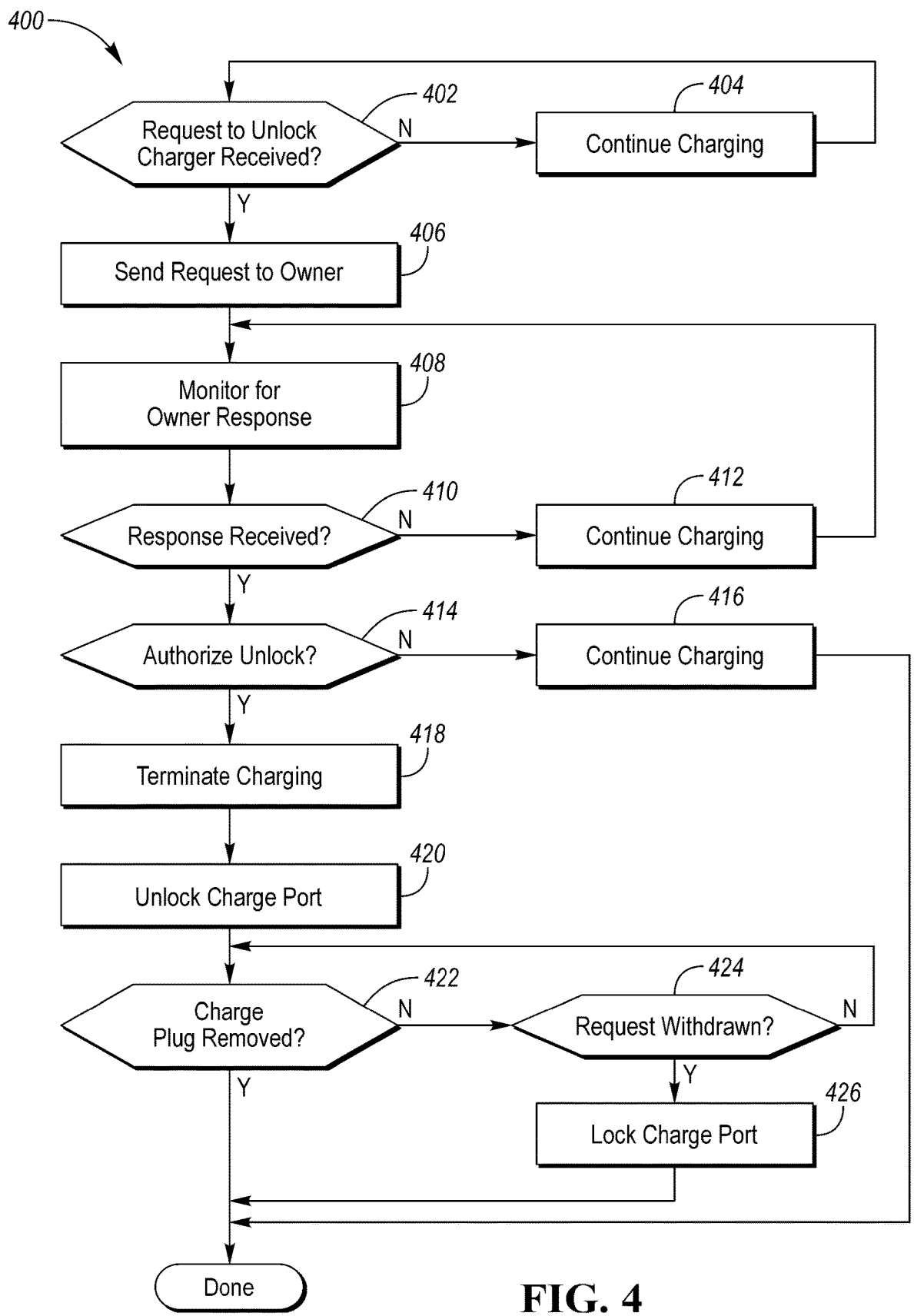
FIG. 4 is a flowchart for a possible set of operations for operating the vehicle charging system for remote unlocking of the charge connector system.

FIG. 4 depicts a flow chart 400 for a possible set of operations that may be implemented by one or more controllers. At operation 402, the system may check if a request to unlock the charger has been received. For example, the charge system controller 306 may monitor for message traffic received by the NFC system 210. If no request is received, the system may continue charging at operation 404. If a request is received, operation 406 may be performed.

At operation 406, the controller (e.g., 306) may send the request to the vehicle owner. For example, the charge system controller 306 may send a communication to the NDO 316 via the cellular modem 204 or the wireless router 206. Operation 408 may be performed to monitor for a response from the owner. For example, the charge system controller 306 may monitor the vehicle communication system 160 for receipt of message traffic from the cellular modem 204 and/or the wireless router 206 that is indicative of a response from the NDO 316. At operation 410, a check may be performed to determine if a response is received. If no response is received, operation 412 may be performed to continue charging. Operation 408 may be repeated to continue monitoring for a response.

If a response is received, operation 414 may be performed to check if the response is to authorize unlocking the charge connector. If the response is not one that authorizes unlocking the charge connector, operation 416 may be performed to continue charging and exit the sequence.

If the response is one that authorizes unlocking the charge connector, operation 418 may be performed. At operation 418, the charge system controller 306 may terminate charging. Terminating charging may include sending any commands to the EVSE 138 to reduce current flow to the traction battery 124. Terminating charging may also include any communication with the EVSE 138 to terminate billing to an account associated with the vehicle owner. At operation 420, the charge system controller 306 may issue commands and/or signals to unlock the charge port 134 so that the EVSE connector 140 may be removed. The charge system controller 306 may perform any operations to disengage the charge port locking mechanism 304 and/or the charge plug locking mechanism 302.

At operation 422, the charge system controller 306 may check to determine if the EVSE connector 140 has been removed from the charge port 134. If the EVSE connector 140 is removed, the sequence may be complete. If the EVSE connector 140 is not removed, operation 424 may be performed to determine if the request has been withdrawn. A request may be withdrawn in response to the NDR 314 sending a terminate request command. The request may be withdrawn if the EVSE connector 140 is not removed from the charge port 134 within a predetermined time period after the authorization. If the request is not withdrawn, operation 422 may be repeated. If the request is withdrawn, operation 416 may be performed to lock the charge port 134. The charge system controller 306 may perform any operations to engage the charge port locking mechanism 304 and/or the charge plug locking mechanism 302.

The charging system described improves the charging experience by allowing charge station users to communicate with one other to improve the charging experience. The system also protects against unauthorized charge stealing, while allowing users to request permission to use the charge station.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a traction battery;
   a wireless transceiver;
   a near field communication (NFC) transceiver; and
   a controller programmed to engage a lock mechanism for securing a charge plug during charging and, responsive to receiving a request to unlock the charge plug via the NFC transceiver, transmit an unlock request and a present state of charge of the traction battery to a vehicle owner via the wireless transceiver, and, responsive to receiving an unlock command via the wireless transceiver, disengage the lock mechanism.

2. The vehicle of claim 1 wherein the wireless transceiver is a cellular modem.

3. The vehicle of claim 1 wherein the wireless transceiver is a wireless network interface.

4. The vehicle of claim 1 wherein the controller is further programmed to, responsive to receiving the unlock command, terminate charging.

5. The vehicle of claim 1 wherein the controller is further programmed to command a charger to disengage the lock mechanism via the wireless transceiver.

6. The vehicle of claim 1 wherein the controller is further programmed to, transmit an unlock response via the NFC transceiver.

7. The vehicle of claim 1 wherein the controller is further programmed to, responsive to receiving the unlock command and detecting that the charge plug is still present after expiration of a predetermined amount of time, engage the lock mechanism.

8. A charging system comprising:
   a lock mechanism configured to secure a charge plug to a charge port of a vehicle;
   a near field communication (NFC) transceiver;
   a cellular modem; and
   a controller programmed to, responsive to the lock mechanism being engaged and receiving a request to unlock the charge plug via the NFC transceiver, transmit an unlock request and a present state of charge of a traction battery being charged to a vehicle owner via the cellular modem, and, responsive to receiving an unlock command via the cellular modem, disengage the lock mechanism.

9. The charging system of claim 8 wherein the NFC transceiver and the cellular modem are installed in the vehicle.

10. The charging system of claim 8 wherein the NFC transceiver and the cellular modem are installed in a charge station.

11. The charging system of claim 8 wherein the unlock request is sent as an email to an email address associated with the vehicle owner.

12. The charging system of claim 8 wherein the unlock request is sent as a text message to a phone number associated with the vehicle owner.

13. The charging system of claim 8 wherein the unlock request is sent as data for an application that is executed on a nomadic device.

14. The charging system of claim 8 wherein the controller is further programmed to, responsive to receiving the request and detecting that the charge plug is still present after expiration of a predetermined amount of time, engage the lock mechanism.

15. The charging system of claim 8 wherein the controller is further programmed to, responsive to receiving the unlock command, terminate charging.

16. A method comprising:
   receiving, via a near field communication transceiver of a vehicle, a request to disengage a lock mechanism securing a charge plug to a charge port of a vehicle during charging;
   sending, via a wireless transceiver of the vehicle, the request and a present traction battery state of charge to a vehicle owner responsive to receiving the request to disengage the lock mechanism; and
   disengaging, by a controller, the lock mechanism responsive to receiving an unlock command via the wireless transceiver.

17. The method of claim 16 further comprising engaging, by the controller, the lock mechanism responsive to expiration of a predetermined amount of time after receiving the unlock command and detecting a presence of the charge plug.

18. The method of claim 16 further comprising sending, via the near field communication transceiver, a response status indicative of a response received via the wireless transceiver.

19. The method of claim 16 further comprising transmitting, via the wireless transceiver, a command to a charger to disengage the lock mechanism.

20. The method of claim 16 further comprising executing an application on a remote device that is coupled to a network to receive the request and send the unlock command.

* * * * *